March 5, 1957  R. H. RIEDEL  2,783,543
INSTRUMENT FOR MEASURING THE ANGLE OF
ROLLING CONTACT IN A BEARING Filed Sept. 30, 1953  2 Sheets-Sheet 1

INVENTOR.
Richard H. Riedel
BY
ATTORNEY

March 5, 1957
R. H. RIEDEL
2,783,543
INSTRUMENT FOR MEASURING THE ANGLE OF
ROLLING CONTACT IN A BEARING
Filed Sept. 30, 1953
2 Sheets-Sheet 2
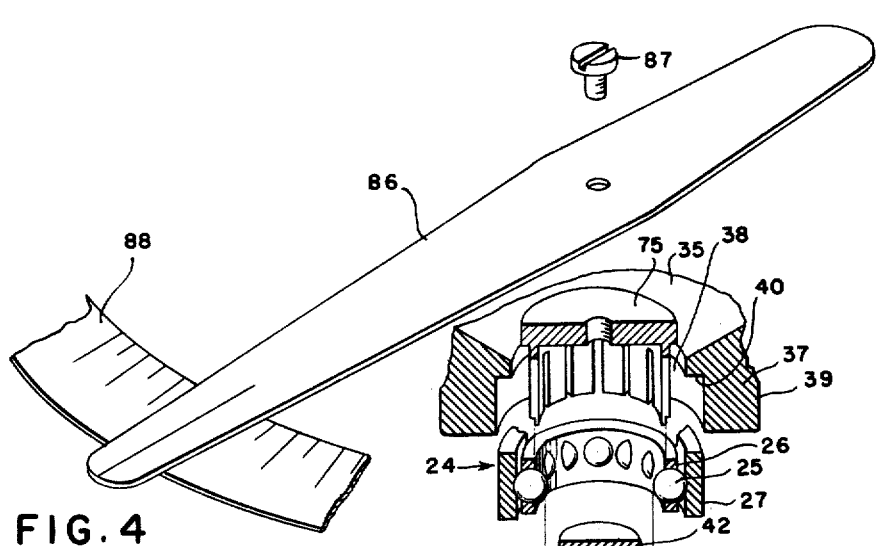
FIG. 4
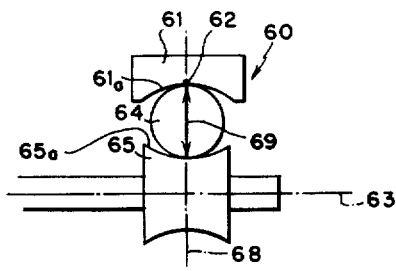
FIG. 5
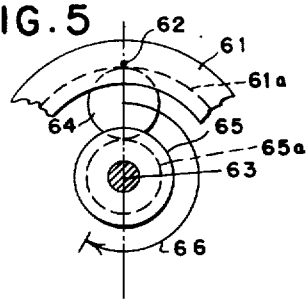
FIG. 6
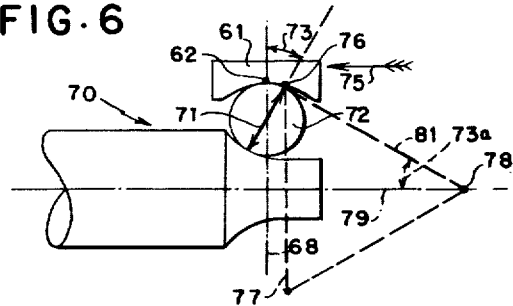
FIG. 3
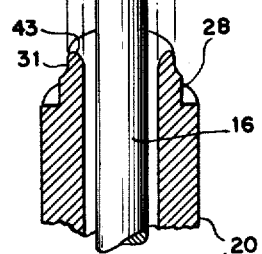
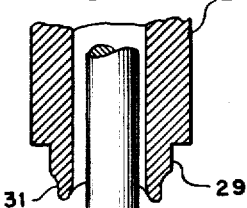
INVENTOR.
Richard H. Riedel
BY
ATTORNEY United States Patent Office 2,783,543
Patented Mar. 5, 1957

2,783,543

INSTRUMENT FOR MEASURING THE ANGLE OF ROLLING CONTACT IN A BEARING

Richard H. Riedel, Packanack Lake, N. J., assignor to Kearfott Company, Inc., Little Falls, N. J., a corporation of New York Application September 30, 1953, Serial No. 383,313

15 Claims. (Cl. 33—174)

This invention relates to an instrument for measuring and indicating directly the angle of rolling contact of a bearing race on its associated bearing balls, in a bearing that is to serve as a radial and end-thrust bearing.

In a conventional radial type bearing, the outer race is ordinarily concentric with the inner race, and the two circles of rolling contact of the bearing balls on the two respective races are usually in the same plane, or substantially so, transverse to the central axis of rotation of the bearing, common to both races.

In bearings that provide both a transverse radial support and an end thrust support for a rotating shaft, or corresponding rotatable member, the two circles of rolling contact of the bearing balls on the inner and on the outer races are axially offset. A projection line through the instantaneous points of contact of each ball on its inner and outer raceways will pass through the center of each bearing ball and will define an angle with a plane transverse to the central axis of rotation of the bearing. Such angle will measure and constitute the angle of rolling contact of the bearing.

Such angle of rolling contact may vary slightly, within predetermined tolerance limits, in bearings considered exactly alike, and even when the bearings are made by the same accurate machining operations of mass-production methods and procedure. Such variations between similar bearings may result from the slight but progressive wear of the machining tools during use, or they may result from other slight variations in tool manipulation, or from other operating conditions.

For ordinary applications any such slight variation in the angle of rolling contact is immaterial. So long as the respective elements of the bearing are within prescribed tolerance limits, those elements, as parts of the bearing, are usually interchangeable. That condition of interchangeability is a necessary basic manufacturing condition, and, having been achieved, is considered sufficient for general applications. Ordinarily, such interchangeability is the ultimate purpose of maintaining the dimensions of elements of an assembly within prescribed tolerance limits. So long as the parts of the assemblies are interchangeable, the manufacturing methods and procedure are considered adequate.

However, where the bearings are to be used to support the two opposite ends of an axle for the spinning wheel of a gyro, a new problem is introduced that must be taken care of and solved if the accuracy of the gyro is to be retained. Where the gyro is to be used as a detecting device and as a control instrument itself, it is essential to eliminate, or, at least, to reduce to an absolute minimum, any friction at the bearings that would look like an external force or force couple impressed on the gyro. Such a force or force couple, arising from friction at the axle bearings, induces the gyro to precess. For these small forces established by friction, the precession movements are slight and appear as drift in axle position.

Where a gyro is used as force detecting or measuring instrument, its precession movement is relied on as an indication of the presence of some external force that is to be detected. The presence of any friction in the bearing for the gyro axle would thus introduce a spurious force, and would thus cause improper operation of the gyro by causing the gyro to drift and to indicate the presence of an external force when no external force actually existed.

It becomes important therefore to provide accurate supporting bearings for the axle of a gyro. Such bearings should be essentially twins in their dimensions and in their motive operation and in their characteristics, so that their rolling operations as bearings shall be essentially identical, and result in the same rate of revolution or angular movement of the bearing balls around the central axis of rotation. Thus any relative retardation of one bearing with respect to the other is avoided. Such retardation would create the impression of an apparent external force or force couple, and would cause the gyro to drift. Even though such precession or drifting were minute, the total integrated effect over a substantial interval of time could become substantial and critical.

This problem and the difficulty introduced thereby become aggravated where the gyro is a relatively small instrument and is adapted for detecting and indicating applications in various control systems for aircraft. In such aircraft applications, the minimization of weight is of importance. Consequently, dimensions of the equipment must be reduced. With the reduction of dimensions, the problem of accuracy and close tolerances becomes aggravated.

The axles for such gyros are relatively small, one such axle having a diameter of the order of $7/16$ of an inch, with a machined surface of the axle serving as the inner race of the bearing at each end of the axle. The diameter of the inner raceway is less than $3/8$ of an inch. The bearing balls themselves are less than $1/8$ of an inch in diameter. The raceway of the outer race thus has a pitch diameter of the order of $1/2$ inch. With such small total dimensions, even very small variations in those dimensions may assume a very substantial significance in affecting the operation of the bearing.

The small bearing balls support the gyro axle with both a radial support and an end thrust support. For most accurate operation, the two separate ball bearings at the respective ends of the axle should have the same characteristics or rolling contact angle, so the rate of revolution of the bearing balls of both bearings around the central axis of rotation of the gyro wheel will be the same. The angular rate of revolution of the bearing balls around the bearing axis is a function of the angle of rolling contact.

Heretofore, there has been no simple method or apparatus available for measuring the angle of rolling contact of such a bearing. Consequently, the bearings could not be matched and paired for such desired use and accurate operation on a gyro. Reliance had to be placed solely on the presumed accuracy of the machining operations.

However, now that the method shown herein is available to ascertain the ultimate mode of operation of the bearing in its assembly under normal working conditions, the presence of slight variations within the normal range of tolerances becomes immaterial, since the paired bearings can be matched according to their equality in the mode of operation.

One object of the present invention therefore is to provide a simple and accurate instrument by means of which a bearing may be easily and quickly tested to ascertain and to indicate its angle of rolling contact.

Another object of the invention is to provide an instrument whereby such a small bearing may be tested under conditions exactly simulating the operating conditions under which the bearing will normally function when in use.

A further object of the invention is to provide an instrument in which such bearings may be tested while directly applied to, and on, the very axle with which they are to function, thereby permitting and enabling easy, ready and quick matching and pairing of the bearings with respect to each other on their operating axle.

The instrument described herein utilizes the relationship between the planetary movement of the bearing balls in their orbit and the angular movement of one of the races of the bearing, to ascertain and to indicate the variation in the orbital movement with variation in the bearing contact angle.

Another object of this invention is to measure the amount of angular retardation of a bearing ball relative to one race, for example, the outer race of the bearing, for one or more rotations of the outer race around its axis of rotation.

Another object of the invention is that it permits the selection of bearings with the optimum rolling contact angle. That is important since proper selection of bearings for certain applications permits minimization of power consumption.

The ability to quickly match bearings for pairing is particularly important in repair operations, where it is necessary to match a replacement bearing to its retained partner in a pair.

A further source of error exists where the two paired bearings for the gyro axle are used as end-thrust bearings to hold the gyro wheel in proper axial position on the axle, to locate and fix the center of gravity of the gyro wheel, but the bearing contact angles are sufficiently different to permit the gyro wheel to shift axially with consequent shift in the center of gravity. The gyro wheel becomes unbalanced and the drift rate of the gyro changes. Measurement of the bearing angles for matching the bearings, as now possible with the instrument disclosed herein, prevents or limits the possibility of such error.

The construction of the instrument for measuring the angle of rolling contact and the manner in which it operates, are shown in the accompanying drawings, in which—

Figure 3 is an exploded isometric view of the elements entering into the bearing test assembly, shown as they are to be disposed on the center post of the instrument in Fig. 2;

Figure 4 is a schematic side sectional view of a radial bearing, to show the coincidence of the pressure line on a bearing ball and the transverse plane through the center of the bearing ball;

Figure 1:
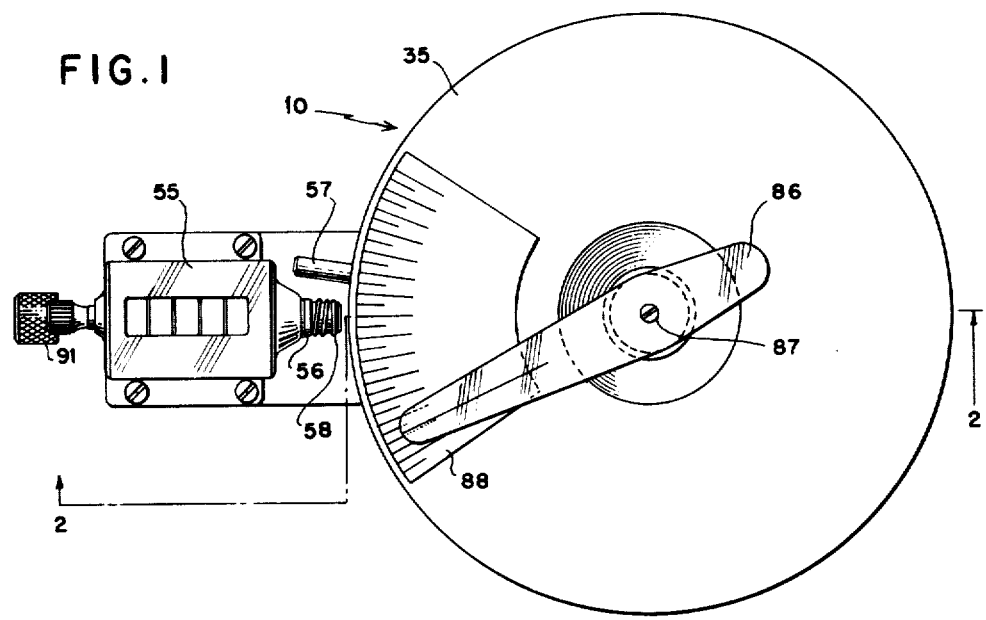
Figure 1 is a plan view of the instrument, and particularly shows the calibrated dial and pointer for indicating a measure of the rolling contact angle of the bearing being tested.

Figure 5 is a schematic transverse sectional view of the radial bearing of Figure 4, to show the angle of revolution covered by a bearing ball in its movement through its planetary orbit while the outer race of the bearing moves through a complete circle; and Figure 6 is a schematic side sectional view similar to that in Figure 4, of a combination radial and thrust bearing, showing how an axial thrust pressure force on the outer race sets up a pressure line on a bearing ball, with the pressure line disposed to form an angle with the transverse plane through the center of the bearing ball.

In the accompanying drawings is shown an instrument 10 for measuring the angle of rolling contact of a ball bearing that is constructed and is to be disposed to function both as a radial bearing and as a thrust bearing. The instrument 10 includes and rests on a heavy thick circular base plate 11, provided with a helically threaded section 12 on the lower portion of its peripheral surface, and with a smooth concentric peripheral track surface 13 on the upper portion of its peripheral surface. A central co-axial opening 14 in the base plate 11 serves to receive and support the shank 15 of a co-axial center post or standard 16, on which the bearings to be tested and their associated elements may be mounted.

The center post 16 is formed or otherwise provided with an enlarged seating section 17 with a shoulder or seat 18 of suitable form and dimension to serve as a conforming seat for one end of a shaft sleeve 20, upon which a gyro wheel is to be mounted and secured for ultimate assembly in the gyro device, after proper bearings are selected by means of the instrument 10 and assembled on the sleeve 20.

The gyro wheel itself does not form part of the invention but is indicated as the element 21 in dotted outline, having its hub closely fitted onto the shaft sleeve 20 and otherwise suitably secured to said sleeve by means not otherwise indicated. The contour outline of the gyro wheel 21 illustrates both the manner in which it is supported on the shaft sleeve 20, and its relative contour dimensions, and the consequent space requirements imposed upon the structure of the instrument, to permit the bearings to be tested and fitted and assembled directly onto the shaft sleeve 20, to provide a complete unit assembly of gyro wheel and shaft sleeve with bearings.

Figure 2:
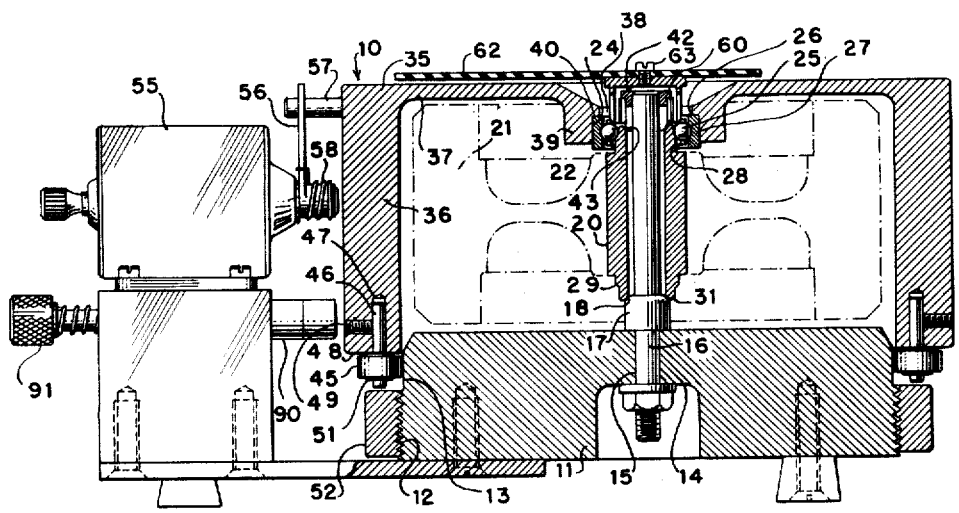
Figure 2 is a side view, partially in section and partially in elevation, taken along the line 2—2 in Fig. 1.

As may be seen from Figures 2 and 3, the shaft sleeve 20 is symmetrical about its central axis and with respect to a central transverse plane. Both ends of the shaft sleeve 20 are similar in contour and dimension. Consequently, when two similar bearings having similar operating characteristics and equal angles of rolling contact are mounted on the shaft sleeve, the assembly of the gyro wheel on its shaft sleeve as a rotatable support, with the two end bearings on the shaft sleeve, constitutes a symmetrical and balanced unit.

As shown in Fig. 2, a bearing 24 to be tested is shown disposed on one end of the shaft sleeve 20. This test bearing 24 will be the actual bearing that will be assembled on the shaft sleeve 20 for use thereon as part of the complete gyro wheel assembly, provided that the angle of rolling contact of the bearing is found to be proper and within the tolerance limits established for this use.

The bearing 24 is to provide both radial support and an end thrust pressure function for the shaft sleeve 20. The radial support function does not introduce any problem in determining the size of the angle of the rolling contact locus. The end thrust function, however, does introduce such variation in the disposition of the locus of the circle of rolling contact, and in the corresponding angle of contact. The manner in which that variation occurs will be considered later in connection with the explanation of the Figures 4 to 6.

The elements of the test bearing 24 that are applied to the shaft sleeve 20 comprise the bearing balls 25, a spacer 26 and the outer race 27. The shaft sleeve 20 is provided with two co-axial end extensions 28 and 29 whose peripheral surfaces are respectively shaped to provide an inner raceway 31 for the bearing balls 25 of the associated bearing to be applied thereon.

In the gyro structure in which the gyro wheel and its bearing supports will be ultimately assembled, each outer race 27 for the respective two ball bearings will be put under an axial compression force to establish a positive axial constraint against axial movement or shifting of the shaft sleeve 20 that supports the gyro wheel for high speed rotation. Since the locus of rolling contact of the bearing balls may vary relative to the inner and the outer raceways, according to the value of such axial compression force, it is necessary to ascertain the actual locus of rolling contact and the actual contact angle with which the bearings will operate under such compression forces.

Consequently, the instrument shown and disclosed herein is constructed to test the bearings under conditions corresponding to the actual operating conditions, so the true angle of contact during operation may be ascertained by the instrument.

In order to impress an axial force on the bearing corresponding to the operating pressure or compression force, the instrument 10 further comprises a cap weight 35 shaped to be fitted over and suspended on the outer race 27 of the test bearing, and of appropriate weight to establish the required co-axial thrust force on the outer race 27 corresponding to the actual compression thrust force that will be impressed on the bearing when it is assembled in its final operating assembly.

The cap weight 35, as shown in Figure 2, embodies a relatively thick cylindrical side wall 36, and a top wall 37. The top wall has a central co-axial opening 38 with a symmetrical enlarged hub section 39 having a seating shoulder 40 of appropriate dimension to permit the seating shoulder 40 to be fitted over the outer race 27 of the bearing with an easy sliding fit, for easy application for the test, and for subsequent easy removal after the test. The thrust pressure on the outer race 27 of the bearing is kept symmetrically balanced by preventing oscillation of the cap weight 35, during its test rotation.

In the test operation on the bearing 24, the cap weight 35 is given a spinning impulse and is permitted to rotate a predetermined number of times, which for the purpose of the present disclosure will be taken as twenty rotations.

In order to support the shaft sleeve 20 in correct co-axial position on the central supporting post 16 during the test operation, an adapter plug 42 is fitted down over the top end of the post 16 and into engagement with the upper end edge 43 of the shaft sleeve 20. The body of the plug adapter 42 is slotted longitudinally to provide several segments with a consequent resiliency that will permit a slight wedging action between the post 16 and the edge 43 of the shaft sleeve 20 to space the upper end of the shaft sleeve symmetrically and co-axially, and at the same time to prevent that shaft sleeve from tending to rotate during the spinning test operation when the cap 35 is rotated.

In order to retain the rotating cap 35 constantly co-axial and concentric with respect to the central axis of the instrument, the lower edge of the cylindrical body 36 of the weight cap 35 is fitted with four idler bearings 45 so the peripheral surfaces of the free outer races of those idler bearings 45 will engage and roll on the smooth track surface 13 on the periphery of the base plate 11.

As shown in Figure 2, each spacer idler bearing 45 is mounted on a supporting pin 46 fitted into an opening 47 extending into the cylindrical body 36 of the cap weight, from the lower edge surface 48. The pin 46 is then anchored in position by a suitable plug screw, for which a threaded opening 49 is provided. As shown a snap washer or snap ring 51 serves to hold the idler bearing 45 in position on the supporting pin 46.

The bearings 24 that are to be assembled on the shaft sleeve 20 are relatively small. It is important therefore that no damaging stresses be impressed on the bearings during the test operation. It is therefore necessary that the test cap weight 35 shall be applied to the test bearing 24 by a soft or gradual application and absolutely without sudden impact.

To provide that safety feature of gradual application of the relatively massive cap weight 35 to the test bearing 24, an elevating and lowering ring 52, internally threaded, is fitted onto the threaded portion 12 of the base plate 11. When the cap weight 35 is to be applied, the elevator ring 52 is first rotated to an elevated position. There its top surface will receive the bottom ends of the pins 46, and stop the cap weight at a position slightly above its seating position, at which the cap weight 35 would meet and seat on the outer race 27 of the test bearing 24.

From such elevated stop position, the elevator ring 52 is then slowly rotated to permit the supported cap weight 35 to gradually lower and seat itself on the bearing 24 that is under test. By reason of the relatively large diameter of the threaded section 12 of the base plate 11, the lowering movement of the elevator ring 52 is relatively slow and the seating of the rotatable cap weight 35 on the outer race of the bearing 24 is soft and gradual, without any force of impact. In that manner no sudden stresses are impressed on the bearing balls that might otherwise distort the balls, or the raceways at the points of contact with the balls.

As previously stated, the cap weight 35 is arranged to be rotated through several rotations, in this case, for example, twenty rotations. For convenience and accuracy in counting the rotations, without requiring concentrated attention of the operator, and yet maintaining an accurate count, a resettable counter 55 is provided and disposed alongside the rotatable cap weight 35. An operating crank arm or lever 56 for the counter 55 is disposed to be engaged by and operated by a tripping pin 57 secured to one side of the rotatable cap weight 35. A return biasing spring 58 restores the operating cam arm or lever 56 to its upright position, back in the path of the tripping pin 57, for subsequent operation.

As previously indicated, the principle of operation of this device involves measuring the amount of retardation of the bearing balls relative to the outer race of the bearing, during operation. As will be explained in connection with Figures 4 to 6, the retardation of the bearing balls relative to the outer race is a function of the contact angle of the bearing balls on the outer raceway.

For example, in the case of a radial bearing 60, as in Figures 4 and 5, during one rotation of the outer race 61, a fixed point 62 on that race will move through an angle measured by a full circle, or two pi radians, around the axis of rotation 63 of the bearing. During that rotation of the outer race 61, each bearing ball 64 will revolve in its planetary orbit through an angle 66 less than a full circle around the axis of rotation 63 of the bearing. The measure of that angle of revolution 66 will be a function of the diameter of the rolling circle of contact on the inner race 65, the diameter of the bearing balls 64, and the diameter of the rolling circle of contact on the outer race 61.

The locus of rolling contact of the balls on the outer race 61 is the circle of intersection of the raceway 61–a of the outer race 61 and a plane 68 transverse to the axis of rotation 63 of the bearing and passing through the centers of the bearing balls 64. In similar manner, the locus of rolling contact of the bearing balls 64 on the inner race 65 is the circle of intersection on the inner raceway 65–a, of the transverse plane 68 through the ball centers.

The rolling contact angle of the ball bearing is the angle between the transverse plane 68 through the centers of the bearing balls, and a pressure diameter 69 through the center of a ball and extending between the two opposite points of contact of the ball on its raceways. In the case of a radial bearing, the pressure diameter lies in the transverse plane, and the rolling contact angle is zero.

In the case of a combination radial and thrust bearing 70, as in Figure 6, the axial end thrust pressure 75 shifts the roller pressure points on the raceways out of the transverse plane 68 through the ball centers. The pressure diameter 71 between the two opposite pressure points on a bearing ball 72 now lies at an angle 73 to the transverse plane 68. That angle 73 is the angle of rolling contact of the combination radial and thrust bearing. The circle of rolling contact on the outer raceway is now located by the pressure points of the bearing balls at the outer ends 76 of diameters 71.

The outer circle of rolling contact is essentially the circular periphery 77 of the base of a virtual cone whose apex 78 is on the main axis 79 of rotation of the bearing.

The apex 78 is located by the tangent lines 81 from the outer pressure points 76 at the outer ends of the pressure diameters 71. The angle 73–a between a tangent line 81 and the main axis 79 is thus equal to contact angle 73 and represents the angle of rolling contact of the bearing. As that contact angle increases, the distance to the apex decreases, and vice versa.

Thus, where such an angle 73 does exist, the radius of the circle of rolling contact 77, representing the distance from pressure point 76 to the main axis of rotation 79, is less than the maximum radius of the outer raceway, representing the distance from main axis 79 to the point 62 on the outer raceway. That maximum radius of the outer raceway to the point 62 is a constant. But the length of the circumference of the circle of rolling contact 77 becomes smaller as the contact angle 73 becomes larger.

Thus, each rotation of the outer race 61, through a complete circle, generates the circular path of point 62. However, the length of the circular path of rolling movement of each bearing ball on the outer contact circle 77, corresponding to the circle generated by point 76, becomes smaller as the contact angle 73 becomes larger. Correspondingly, the angle of revolution of each bearing ball around the central axis 63 becomes smaller as the contact angle becomes larger, and vice versa. The angular distance of revolution of each bearing ball around central axis 63 is thus a function of the bearing contact angle. Similarly, the angle of retardation of the bearing balls relative of the outer race, is a function of the bearing angle.

The angle of retardation of a bearing ball is the difference between the complete circular angle of two pi radians, traversed by the spot 62 on the outer race 61, and the angle of revolution traversed by the center of a bearing ball 72 around the central axis 63 while the spot 62 travels through its complete circle of two pi radians. Thus, during each full rotation of the outer race 61 thru two pi radians, the bearing balls 72 move just shy of two pi radians around the central axis 63. An appropriate multiplication of those shy angular dimensions, or retardations of a ball for each rotation of the outer race 61, will provide a product that is relatively close to an integral number of two pi radians.

The instrument described herein may be considered as operating to totalize the actual or partial angles of revolution of the bearing balls, for several rotations of the outer race 61, to accumulate an integral number of complete circles, so a deviation from an integral number of such complete circles may be measured on a dial of relatively small arcuate dimension.

Alternatively, the instrument may be considered as operating to accumulate the retardation or shy angles of the bearing balls for each rotation of the outer race, until such accumulated shy angles add up to only a small deviation from an integral number of complete circles, so such small deviation may be readily indicated on a dial subtending a small angle of arc.

In either case, the dial may be calibrated to indicate directly the angle of rolling contact.

In order to measure that retardation of the bearing balls relative to the outer race, as they revolve in their planetary orbit around the central axis of the instrument, a lightweight clutch adapter 85 is fitted down over the top inner edge of the separator 26 of the test bearing 24, in order to rotate with that separator 26 as the bearing balls are revolved through their orbit by the rotation of the outer race 27. An indicator or pointer 86 is attached to the top of the clutch 85 by a simple screw 87 so the pointer 86 will rotate with the clutch 85 and indicate the corresponding position of the separator 26, and also of the bearing balls, with respect to a predetermined fixed point on the raceway of the outer race 27 at the completion of any predetermined number of rotations of the outer raceway, as indicated by the counter mechanism 55.

A relative retardation or delay of the bearing balls themselves, relative to the raceway 27, is then indicated by the pointer 86 on a fixed scale 88 on the top surface of the rotatable cap weight 35.

The scale 88 need not be calibrated where the instrument is to be used merely as a comparator for locating similar or twin bearings. By suitable calibration, however, the scale will indicate the rolling contact angle of the bearing for a calibration characteristic of the bearing.

Since the scale 88 will normally be calibrated over a small arcuate section, the device may be provided with several scales around the border of the top surface of the spinning weight, to permit testing of several different types or sizes of bearings.

When the test weight 35 has made the number of rotations predetermined for the particular contact angle, the weight may be readily stopped by a spring biased brake 90 provided with a suitable releasing and resetting knob 91.

Where a single bearing is to be tested alone, without regard to pairing or to fitting onto a shaft 20, an adapter similar to the shaft 20 may be employed with suitable contour to support the bearing to be tested. The testing is not limited to bearings of the types shown here, but may be performed on any commercial bearings, standard or special, with or without separators. For bearings without separators a suited slotted element may be disposed to serve as a separator for the bearings and to serve as a carrier for the pointer to indicate the angular movement of revolution of the bearings in their orbit.

Various other modifications may be made in the structure without departing from the spirit and substance of the invention.

What is claimed is:

1. An instrument for measuring and indicating directly the angle of rolling contact of a bearing race on its associated bearing balls in a bearing having two races with bearing balls between them, said instrument comprising a support for one race of the bearing to be tested, means for rotating the other race of the bearing in its normal intended position of operation on the bearing balls to revalue the balls in their operating orbit, and means for measuring the orbital movement of the bearing balls relative to the angular movement of the rotated race.

2. An instrument for measuring and indicating directly the angle of rolling contact of a bearing race on its associated bearing balls in a bearing having two races and bearing balls between them, said instrument comprising a support for one race of the bearing to be tested, means for rotating the other race of the bearing in its normal intended position of operation on the bearing balls to revalue the balls in their operating orbit, and means for measuring the relative angular movement between the angular movement of a fixed point on the rotated race and the angular movement of the center of one of the bearing balls in its orbital path.

3. An instrument for measuring and indicating directly the angle of rolling contact of a bearing race on its associated bearing balls in a bearing having two races with bearing balls between them, said instrument comprising a support for one race of the bearing to be tested, means for rotating the other race of the bearing in its normal intended position of operation on the bearing balls to revalue the balls in their operating orbit, means for measuring an angle of rotational movement of said other race around its axis, means for measuring the angle of revolution of a bearing ball in the orbital path around the same axis, and means for comparing and indicating the relation between said two angle measurements.

4. An instrument for measuring the angle of rolling contact of a ball bearing having an inner race, an outer race and bearing balls between them, and intended for combination radial and end-thrust service, said instrument comprising means for supporting the bearing with the inner race of the bearing in stationary position; means for impressing an axial end-thrust force on the outer race;

means for rotating the outer race through a predetermined angle of rotation thereby simultaneously revolving the bearing balls in their orbital path; and means responsive to orbital movement of the bearing balls for indicating the difference in angular displacement between the bearing balls in their orbit of revolution and the outer race during such simultaneous movement of the race and the bearing balls.

5. An instrument for measuring the angle of rolling contact of a ball bearing having an inner race, an outer race and bearing balls between them, and intended for combination radial and end-thrust service, said instrument comprising means for supporting the bearing with the inner race of the bearing in stationary position; means for impressing an axial end-thrust force on the outer race; means for rotating the outer race through a predetermined angle of rotation, while said outer race is subjected to said axial end-thrust thereby simultaneously revolving the bearing balls in their orbital path; and means responsive to orbital movement of the bearing balls for indicating the difference in angular displacement between retardation of the bearing balls in their orbit of revolution relative to the outer race.

6. An instrument for measuring the angle of rolling contact of a ball bearing having an inner race, an outer race and bearing balls between them, and intended for combination radial and end-thrust service, said instrument comprising means for supporting the bearing with the inner race of the bearing in stationary position; means for impressing an axial end-thrust force on the outer race; means for rotating the outer race through a predetermined angle of rotation, thereby effecting revolving movement of the bearing balls in their orbit of revolution, while said outer race is subjected to said axial end-thrust; and means responsive to orbital displacement movement of the bearing balls for indicating the angular displacement between the difference in bearing balls in their orbit of revolution and to the outer race in its rotation.

7. An instrument for measuring the angle of rolling contact of a ball bearing intended and constructed for combination radial and end-thrust operation, said instrument comprising means for supporting the bearing with one race held fixed and the other race free relative to a central axis; means for spinning the free race and effecting revolution of the bearing balls in their orbit about said axis; and means for measuring the angular displacement of the spinning race and the corresponding angular displacement of the bearing balls about said axis, and for indicating a mathematical relationship between the two angular displacements.

8. An instrument for measuring the angle of rolling contact of a ball bearing intended and constructed for combination radial and end-thrust operation, said instrument comprising means for supporting the bearing with one race held fixed and the other race free relative to a central axis; means for impressing axial end-thrust pressure on the free race; means for spinning the free race and effecting revolution of the bearing balls in their orbit about said axis; and means for measuring the angular displacement of the spinning race and the corresponding angular displacement of the bearing balls about said axis, and for indicating a mathematical relationship between the two angular displacements.

9. An instrument for measuring the angle of rolling contact of a ball bearing intended and constructed for combination radial and end-thrust operation, said instrument comprising means for supporting the bearing with one race held fixed and the other race free relative to a central axis; means for impressing axial end-thrust pressure on the free race and spinning said free race while subjecting said race to said axial end-thrust pressure, with resultant revolution of the bearing balls in their orbit; means for measuring the angular displacement of the spinning race; and means for measuring the angular displacement of the bearing balls in their orbital path of revolution and for indicating the algebraic relation between the measurement of the angular displacement of the spinning race and the angular displacement of the bearing balls in their orbital path.

10. An instrument for measuring and indicating the relative angles of rolling contact of tested ball bearings of similar dimensions and design construction, comprising a support for one race of a test bearing disposed to leave the other race free to rotate about the axis of the bearing; means to impress and maintain a constant axial pressure force on the free race during a spinning test operation of the free race; means for spinning the free race through a predetermined angle around said axis to cause the bearing balls to revolve in their orbit; means for indicating the angular movement of the free race; means for indicating the angular revolution of the bearing balls; and means for relating the two indicating means to show directly a value representing a mathematical function of the retardation of the bearing balls relative to the free race.

11. An instrument for measuring the angle of rolling contact of a radial and end-thrust ball bearing, comprising a base plate of substantial mass to provide stability for the instrument; a vertical standard supported by the base plate to establish a main vertical axis of rotation; means on the standard to support and position the inner race of a test bearing in concentric position relative to said axis while leaving the outer axis free to rotate; a hollow cylindrical cap weight having a top wall with a hollow hub dimensioned to fit and seat onto the outer race of the test bearing; an elevator ring supported on the base plate and physically related thereto to permit gradual coaxial elevation of the ring to a top position or lowering on said base plate to a bottom position, said elevator ring serving in its top position as a bottom stop for the cap weight and as a support to hold the cap weight above and out of contact with the outer race of the test bearing; and said elevator ring serving to lower the cap weight gradually co-axially onto the outer race with a slow gradual application, when the ring itself is lowered, whereby the ultimate engagement and nesting of the cap weight on the outer race is effected gradually and without any impact stresses on the bearing balls.

12. A test instrument for radial and thrust ball bearings, as in claim 11, in which the cap weight is provided on its upper surface with a graduated scale with angularly spaced markings; and said instrument comprising, further, a cup to be rotated by the revolving bearing balls; and a pointer secured to said cup to be rotated as a radius arm with the cup and to indicate on said graduated scale a reading bearing a functional relation to the angle of rolling contact of the bearing.

13. An instrument to measure and indicate the angle of rolling contact which will be established in a combination radial and thrust bearing under normal load conditions, said instrument comprising a support to hold the test bearing in a position to permit normal operating rotation of the bearing about its axis; means for axially loading the bearing, during the test operation, to an extent corresponding to the loading which the bearing will experience during normal operation; means for operating the bearing to rotate one race of the bearing through a predetermined angle to revolve the bearing balls in their orbit; and means for measuring the length of the orbital movement of the bearing balls and for indicating the terminal value of such measurement.

14. An instrument to measure and indicate the angle of rolling contact which will be established in a combination radial and thrust bearing under normal load conditions, said instrument comprising a support to hold the test bearing in a position to permit normal operating rotation of the bearing about its axis; means for axially loading the bearing, during the test operation, to an extent corresponding to the loading which the bearing will experience during normal operation; means for operating the bearing to rotate one race of the bearing through a predetermined angle to revolve the bearing balls in their orbit; a calibrated scale; means supporting the calibrated scale to rotate with the rotating race; and means to rotate with the bearing balls to indicate the end terminal position of their orbital movement on said calibrated scale, corresponding to a predetermined angular movement of the rotated race.

15. An instrument to measure and indicate a value representative of the angle of rolling contact in a radial and end-thrust bearing having an inner race, an outer race and bearing balls with a spacer between the races, said instrument comprising means to support the bearing for normal rotational operation while holding one race stationary and leaving the other race free; means to be applied to the free race to rotate therewith; means to be applied to the spacer to rotate therewith; a calibrated scale on one of the said means that is to be applied for rotation; and a pointer on the other of said means that is to be applied for rotation, whereby the calibrated scale and the pointer will indicate a value representative of the rolling contact angle after a predetermined number of rotations of the free bearing race.

References Cited in the file of this patent

UNITED STATES PATENTS 1,117,187    Hess _____ Nov. 17, 1914

U. S. DEPARTMENT OF COMMERCE
PATENT OFFICE

CERTIFICATE OF CORRECTION

Patent No. 2,783,543                                               March 5, 1957

Richard H. Riedel

It is hereby certified that error appears in the printed specification of the above numbered patent requiring correction and that the said Letters Patent should read as corrected below.

Column 8, line 42, claim 1, line 52, claim 2, and line 64, claim 3, for "revalue", each occurrence, read -- revolve --.

Signed and sealed this 15th day of April 1958.

(SEAL)
Attest:
KARL H. AXLINE
Attesting Officer

ROBERT C. WATSON
Commissioner of Patents